No. 680,018. Patented Aug. 6, 1901.
C. H. BRAKE.
TIME INDICATOR.
(Application filed Aug. 3, 1900.)

(No Model.) 2 Sheets—Sheet 1.

WITNESSES:
Edward Thorpe.
John Lotka

INVENTOR
Charles H. Brake.
BY
ATTORNEYS

No. 680,018. Patented Aug. 6, 1901.
C. H. BRAKE.
TIME INDICATOR.
(Application filed Aug. 3, 1900.)
(No Model.) 2 Sheets—Sheet 2.
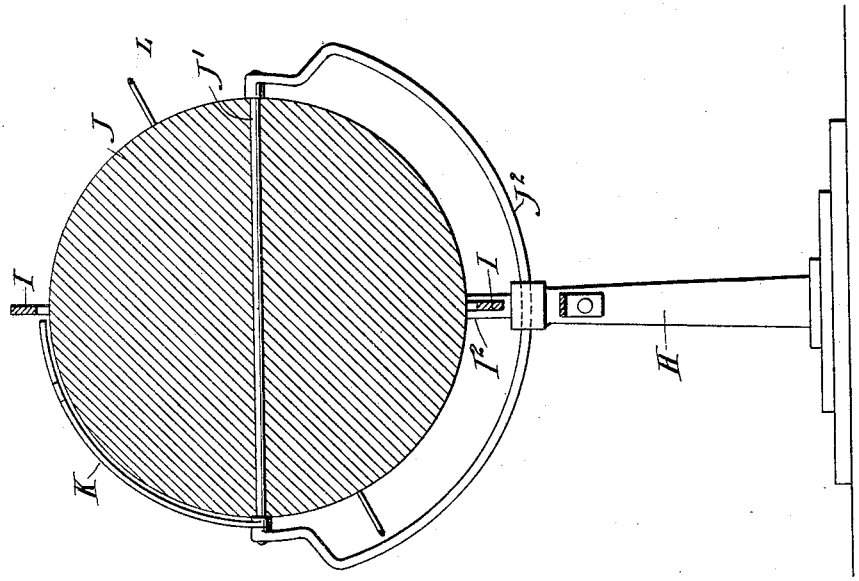
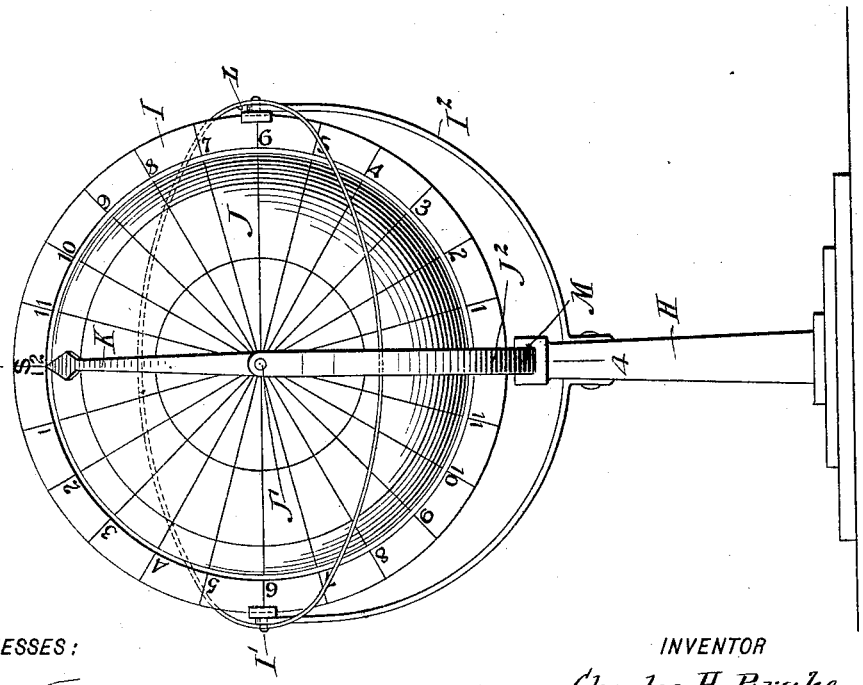
WITNESSES:
Edward Thorpe
John Lotka
INVENTOR
Charles H. Brake.
BY
ATTORNEYS

UNITED STATES PATENT OFFICE.

CHARLES H. BRAKE, OF HAWARDEN, IOWA.

TIME-INDICATOR.

SPECIFICATION forming part of Letters Patent No. 680,018, dated August 6, 1901.

Application filed August 3, 1900. Serial No. 25,784. (No model.)

*To all whom it may concern:*

Be it known that I, CHARLES H. BRAKE, a citizen of the United States, and a resident of Hawarden, in the county of Sioux and State of Iowa, have invented a new and Improved Time-Indicator, of which the following is a full, clear, and exact description.

My invention relates to devices for indicating the time occurring simultaneously at different points of the globe and for solving problems connected with the change of date and with the local times of different cities.

The object of my invention is to provide a simple and efficient device of the above-indicated class.

The invention will be fully described hereinafter and the features of novelty pointed out in the appended claims.

Reference is to be had to the accompanying drawings, forming a part of this specification, in which similar characters of reference indicate corresponding parts in all the views.

Figure 1:
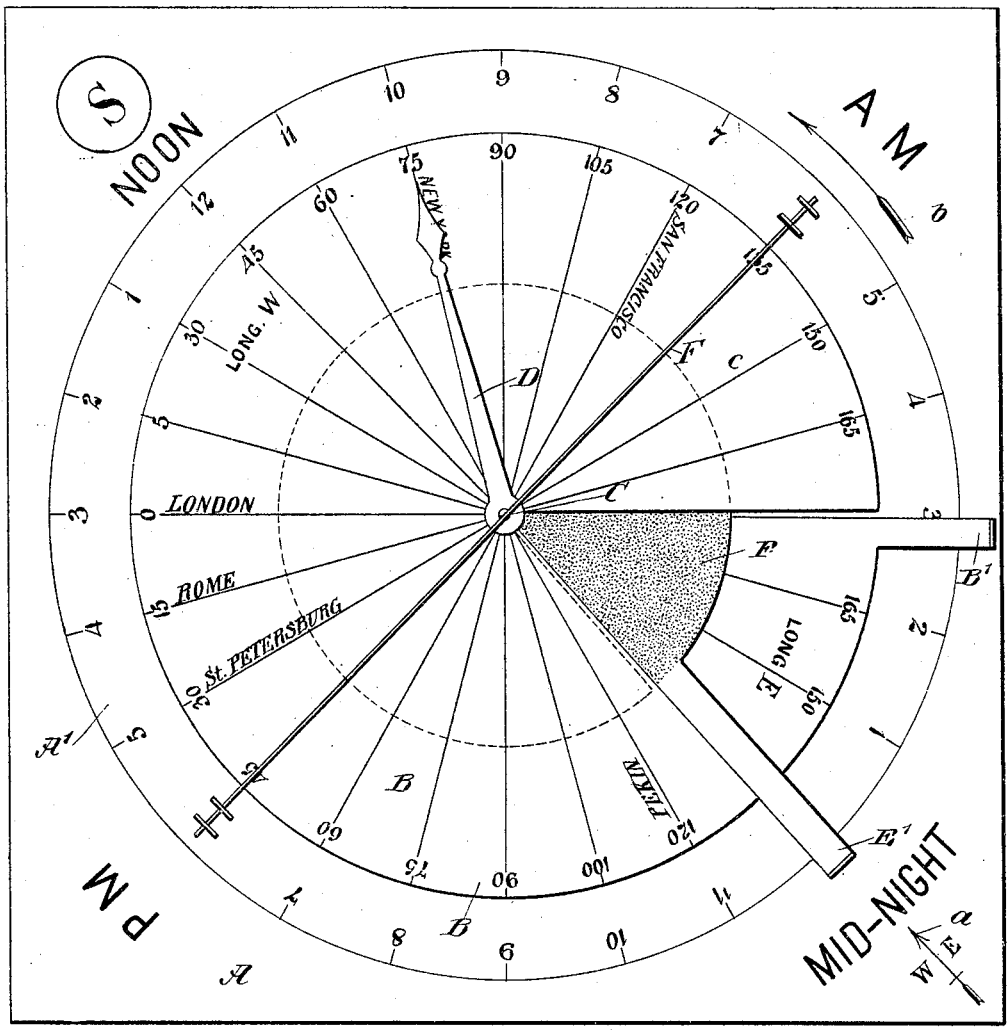
Figure 2:
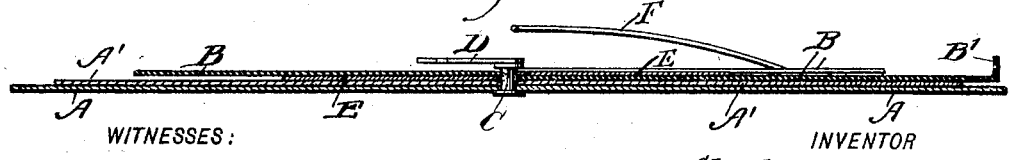

Figure 1 is a plan of one form of my invention applied to a plane disk. Fig. 2 is a central sectional elevation thereof. Fig. 3 is a perspective view of a globe having my time-indicator applied thereto, and Fig. 4 is a sectional elevation on the line 4 4 of Fig. 3.

In Figs. 1 and 2, A is a support or base of any suitable shape and carrying what I term the "ecliptic" or "hour" circle A', (preferably rotatable on said support,) divided into twenty-four spaces, numbered in two series from "1" to "12," corresponding to the hours of the day and night. Adjacent to the two numbers "12" are produced the indications "noon" and "midnight," respectively, also a radial arrow $a$, with the letters "E" and "W" (east and west) on opposite sides thereof. The designations "A. M." and "P. M." are also provided to distinguish the hours of the forenoon from those of the afternoon. An arrow $b$ is provided to indicate the direction in which certain parts described hereinafter should be rotated.

At the center of the hour-circle is pivotally attached the meridian-bearer B, which is a disk provided with a series of lines or meridians $c$, intersecting at the pivot C. The meridians are numbered in the usual way and may also bear the names of localities situated under them, as New York, Rome, London, Pekin, &c., and, further, the meridian-bearer may have produced upon it a map (planisphere) of the northern or southern hemisphere; but other projections may be employed. The meridian-bearer has a handle B' projecting beyond its periphery to facilitate the manipulation of the meridian-bearer.

With the meridian-bearer is adapted to rotate an hour-hand D, which, however, is adjustable, for instance, by being mounted upon the pivot C (which rotates with the disk B) sufficiently tight to normally turn with said pivot, but still loosely enough to permit the hand to be adjusted to any one of the meridians of the disk B. The hand D is not absolutely essential.

Upon the pivot C is loosely mounted an indicator E, which, as shown, is a disk provided with a handle E' and slitted adjacent to said handle, and the disk B also has a radial slot adjacent to its handle B', so that the radial edge of one disk may pass through the slit of the other, allowing part of the indicator-disk E to lie over the meridian-bearer B and the other part under the meridian-bearer, as shown.

Finally, my improved time-indicator has a day and night arc F, pivoted to the hour-circle about the axis F'. This day and night arc is for the purpose of indicating the relative length of day and night according to the seasons, it being well known that at the equator the sun rises every day at six a. m., while on the northern hemisphere the sun rises before six a. m. in spring and summer and after six a. m. in autumn and winter, or, in other words, the question whether it is day or night at any particular point of the earth is determined by its latitude, its longitude, and the date or season.

The indicator E may be omitted, it being sufficient to mark the one hundred and eightieth meridian more prominently than the others, this meridian then forming the indicator.

The indicator E when partly overlapping the meridian-bearer B is clamped therein sufficiently to cause both disks to move together when the disk B is turned.

To indicate the change of date exactly, (since the one hundred and eightieth meridian is not the line on which the date changes,) the actual so-called "international date-line" may be indicated upon the map carried by the disk B.

It will be obvious that various problems may be solved with ease by the aid of my improved apparatus, which also clearly shows the elements of such problems. Thus the indicator shows at a glance that to a difference of fifteen degrees in longitude corresponds a difference of one hour in time. A simple subtraction shows the difference in time between New York and San Francisco to be three hours. By bringing the meridian of New York to register with ten a. m. the simultaneous local time of various other cities will be indicated, as in Fig. 1. The disk B instead of being worked by hand could be operated continuously by clockwork, so as to form a clock indicating the time of all points on the globe.

The device may also be used for solving problems like this: Suppose a traveler leaves New York at noon on a journey westward and proceeds so rapidly as to keep the sun in his meridian, where will he change his date and at what o'clock, New York time? This can be solved simply by turning the meridian-bearer until the meridian of New York registers with twelve o'clock noon. The one hundred and eightieth meridian (indicating the change of date) is then at five a.m.—that is, there is a difference of seven hours between New York time and that of the date-changing meridian, and as the traveler travels westward as fast as the sun he will reach the date-line in seven hours—that is, at seven p. m. New York time. The same problem can be solved as follows: Turn the meridian-bearer until the one hundred and eightieth meridian (handle B') is at twelve o'clock noon, the seventy-fifth meridian (New York) will then register with seven p. m., which gives the desired solution.

As illustrated in Figs. 3 and 4, the indicator comprises a base H, to which is attached the hour-circle I, divided into twenty-four parts, like the hour-circle A' of the form shown in Figs. 1 and 2. The hour-circle is rotatable in its own plane and is capable also of a vibrating motion about an axis I', carried by an arm I², to allow it to take any desired angle with the plane of the equator of the meridian-bearer. The meridian-bearer is in this case formed by the globe J, pivotally mounted upon an axis J', carried by an arm J² in the usual manner. This globe is provided with the usual maps, and instead of a separate indicator has the one hundred and eightieth meridian, or, better, the international date-line, prominently marked upon the globe. The hour-hand K, which is curved like the meridians, is secured to the globe at one of the poles and rotates with the globe, but may be adjusted to any meridian in a similar manner to that described with reference to Figs. 1 and 2. The arm J² slides through a slot M in the base H, so as to bring the axis of the globe to any desired angle. The hour-circle may carry at the noon-point an electric-light globe or any other attachment to serve as a sun. Finally, the globe has also a day and night arc L, mounted to swing about the axis I', so that it can be brought over the meridian-bearer to indicate the line of shadow for either the northern or southern hemisphere of the globe. This arc may be a complete circle or only a semicircle. The manner of using this form of my invention is exactly the same as described with reference to Figs. 1 and 2.

Having thus described my invention, I claim as new and desire to secure by Letters Patent—

1. A time-indicator, comprising a base, an hour-circle rotatable in its own plane and divided according to the hours of the night and day, a meridian-bearer rotatable about an axis disposed at an angle to the plane of the hour-circle, said meridian-bearer being provided with a series of lines adapted to register with the divisions of the hour-circle, and a night and day arc mounted to swing about an axis extending transversely of that of the meridian-bearer and lying in the plane of the hour-circle.

2. A time-indicator, comprising a base having an hour-circle divided according to the hours of the night and day, a meridian-bearer rotatable about the center or axis of the hour-circle, and provided with a series of lines adapted to register with the divisions of the hour-circle, said meridian-bearer having a radial slit at the one hundred and eightieth meridian, and an indicator consisting of a radially-slotted plate pivoted about the same axis as the meridian-bearer and adapted to partially overlap the same.

3. A time-indicator, comprising a base having an hour-circle divided according to the hours of the night and day, a meridian-bearer rotatable about the center or axis of the hour-circle, and provided with a series of lines adapted to register with the divisions of the hour-circle, said meridian-bearer having a radial slit at the one hundred and eightieth meridian, an indicator consisting of a radially-slotted plate pivoted about the same axis as the meridian-bearer and adapted to partially overlap the same, an hour-hand secured to the meridian-bearer at the axis thereof and held to normally rotate therewith, but adjustable to any meridian, and a night and day arc pivoted to the base about an axis extending transversely of that of the meridian-bearer.

In testimony whereof I have signed my name to this specification in the presence of two subscribing witnesses.

CHARLES H. BRAKE.

Witnesses:
D. T. GEARHART,
C. D. MUXEN.